US008286068B2

United States Patent
Brush et al.

(10) Patent No.: US 8,286,068 B2
(45) Date of Patent: Oct. 9, 2012

(54) LINKING DIGITAL AND PAPER DOCUMENTS

(75) Inventors: Alice Jane B. Brush, Bellevue, WA (US); Katherine Everitt, Seattle, WA (US); Meredith Morris, Bellevue, WA (US); Andrew Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 12/109,727

(22) Filed: Apr. 25, 2008

(65) Prior Publication Data

US 2009/0271691 A1    Oct. 29, 2009

(51) Int. Cl.
*G06F 17/00* (2006.01)

(52) U.S. Cl. ......... 715/201; 715/205; 715/200; 715/229

(58) Field of Classification Search .................. 715/200, 715/205, 229, 201
See application file for complete search history.

(56) References Cited

U.S. PATENT DOCUMENTS

| | | | |
|---|---|---|---|
| 5,990,931 A * | 11/1999 | Nimri et al. ................ 348/14.08 |
| 6,081,261 A | 6/2000 | Wolff et al. |
| 6,195,093 B1 * | 2/2001 | Nelson et al. ................ 715/732 |
| 6,311,214 B1 | 10/2001 | Rhoads |
| 6,625,299 B1 * | 9/2003 | Meisner et al. ............... 382/103 |
| 6,940,491 B2 * | 9/2005 | Incertis Carro .............. 345/173 |
| 7,289,110 B2 | 10/2007 | Hansson |
| 7,607,076 B2 * | 10/2009 | Wang et al. .................... 715/200 |
| 2001/0022675 A1 * | 9/2001 | Kelly et al. ................... 358/488 |
| 2002/0111960 A1 | 8/2002 | Irons et al. |
| 2003/0049037 A1 * | 3/2003 | Sadowara et al. ............... 399/27 |
| 2003/0058227 A1 * | 3/2003 | Hara et al. .................... 345/178 |
| 2003/0072568 A1 * | 4/2003 | Lin et al. ..................... 396/222 |
| 2003/0121006 A1 * | 6/2003 | Tabata et al. .................. 715/513 |
| 2003/0165276 A1 * | 9/2003 | Seeger et al. ................. 382/278 |
| 2005/0086224 A1 * | 4/2005 | Franciosa et al. ................ 707/6 |
| 2005/0247783 A1 | 11/2005 | Poulos et al. |
| 2005/0262429 A1 | 11/2005 | Elder et al. |
| 2006/0028689 A1 * | 2/2006 | Perry et al. ................... 358/3.28 |
| 2006/0190818 A1 * | 8/2006 | Wang et al. ................... 715/530 |
| 2006/0204515 A1 | 9/2006 | Ben-Menachem et al. |
| 2006/0285772 A1 | 12/2006 | Hull et al. |
| 2007/0013970 A1 * | 1/2007 | Yorimoto ..................... 358/474 |
| 2007/0047816 A1 * | 3/2007 | Graham et al. ............... 382/181 |
| 2007/0047818 A1 * | 3/2007 | Hull et al. .................... 382/190 |
| 2007/0247422 A1 * | 10/2007 | Vertegaal et al. ............. 345/156 |

(Continued)

OTHER PUBLICATIONS

Norrie, et al., "Print-n-Link: Weaving the Paper Web", DocEng'06, Oct. 10-13, 2006, Amsterdam, The Netherlands. 10 Pages.

(Continued)

*Primary Examiner* — Stephen Hong
*Assistant Examiner* — Marshon Robinson

(57) ABSTRACT

Various embodiments facilitate linking physical documents to digital documents. Links link physical documents to digital documents. Using a sensor, the physical documents are automatically detected and identified on a digital workspace. A computer is capable of displaying graphics, and user interaction with displayed graphics can be detected. The digital workspace displays a GUI component having one or more controls, and the GUI component is displayed at a location relative to a physical document on the digital workspace. User interaction with the control is detected and either a link between the physical document and one of the digital documents is edited, or an existing link between the physical document and a digital document is used to perform an operation on the digital document. Alternatively or additionally, links may be automatically generated digital documents determined to be implicitly related to the physical document.

20 Claims, 7 Drawing Sheets

U.S. PATENT DOCUMENTS

2008/0192209 A1* 8/2008 Duine et al. ............... 353/85
2009/0016615 A1* 1/2009 Hull et al. ............... 382/217

OTHER PUBLICATIONS

Nelson, et al., "Palette: A Paper Interface for Giving Presentations", Proceedings of the SIGCHI conference on Human factors in computing systems: the CHI is the limit. 1999 Pittsburgh, Pennsylvania, United States. pp. 354-361.

Luff, et al., "Augmented Paper: Developing Relationships between Digital Content and Paper", Springer Berlin / Heidelberg. vol. 4500/2007. pp. 275-297.

MacKay, "Augmented Reality: Linking real and virtual worlds a new paradigm for interacting with computers", Proceedings of AVI'98, ACM Conference on Advanced Visual Interfaces, New York: ACM Press. pp. 13-21.

Arai, "PaperLink: A Technique for Hyperlinking from Real Paper to Electronic Content", CHI 97 Electronic Publications: Papers. http://sigchi.org/chi97/proceedings/paper/seh.htm.

Anoto http://www.anoto.com/.

Everitt, et al., "Two worlds apart: bridging the gap between physical and virtual media for distributed design collaboration" Report No. UCB//CSD-02-1201, Oct. 2002. Computer Science Division, EECS. University of California, Berkeley 94720-1776. 9 Pages.

Guimbretiere, "Augmented Digital Documents" Proceedings of the 16th annual ACM symposium on User interface software and technology. 2003. pp. 51-60.

Heiner, et al., "Linking and messaging from real paper in the Paper PDA", Proceedings of the 12th annual ACM symposium on User interface software and technology. 1999. pp. 179-186.

Kim, et al., "Video-based document tracking: unifying your physical and electronic desktops", Proceedings of UIST 2004, pp. 99-107.

Klemmer, et al., "Where do web sites come from? Capturing and interacting with design history", In Proc. CHI 2002, ACM Press (2002), 1-8.

Koike, et al., "Integrating paper and digital information on Enhanced-Desk: a method for realtime finger tracking on an augmented desk system" ACM Trans. Comput.-Hum. Interact. 8, 4 (Dec. 2001), 307-322.

Liao, et al., "PapierCraft: a command system for interactive paper", In Proceedings of UIST05. ACM, New York, pp. 241-244.

Mander, et al., "A "pile" metaphor for supporting casual organization of information", Proceedings of the SIGCHI conference on Human factors in computing systems. 1992. pp. 627-634.

Smith, et al., "GroupBar: The TaskBar Evolved", In Proc. OZCHI'03. pp. 1-10.

Stifelman, et al., "The audio notebook: paper and pen interaction with structured speech", Proceedings of the SIGCHI conference on Human factors in computing systems. CHI 2001.

Ullmer, et al., "mediaBlocks: physical containers, transports, and controls for online media", Published in the Computer Graphics Proceedings (SIGGRAPH'98), Jul. 19-24, 1998. pp. 1-8.

Underkoffler, et al., "Urp: a luminous-tangible workbench for urban planning and design" Proceedings of the SIGCHI conference on Human factors in computing systems: the CHI is the limit. Pittsburgh, Pennsylvania, United States. 1999. pp. 386-393.

Wellner, "Interacting with paper on the DigitalDesk" Technical Report No. 330. University of Cambridge. Mar. 1994. 107 Pages.

Wilson, et al., "BlueTable: connecting wireless mobile devices on interactive surfaces using vision-based handshaking" Graphics Interface 2007, vol. 234. 7 Pages.

Wilson, "PlayAnywhere: a compact interactive tabletop projection-vision system" UIST'05, Oct. 23-27, 2005, Seattle, Washington, USA. 10 Pages.

Yeh, et al., "ButterflyNet: a mobile capture and access system for field biology research", Proceedings of the SIGCHI conference on Human Factors in computing systems. Montrëal, Québec, Canada. 2006. pp. 571-580.

Rogers, et al., "Extending Tabletops to Support Flexible Collaborative Interactions", Proceedings of the First IEEE International Workshop on Horizontal Interactive Human-Computer Systems (TABLETOP '06), Year of Publication: 2006, pp. 71-78.

* cited by examiner

LINKING DIGITAL AND PAPER DOCUMENTS

BACKGROUND

Described below are techniques for helping a user work with and manage both physical and digital documents. For many years, information workers have increasingly come to accomplish tasks using software such as word processing applications, email applications, spreadsheet applications, graphics applications, and others. These applications typically work with units of information referred to as documents. For example, a word processing application might work with text oriented documents. These digital documents are persistently stored and then accessed from time to time. While it is possible to view and edit a digital document with a corresponding application, it is often desirable to print the digital document in the form of a physical or paper document. Printed documents are convenient to read, manually annotate, transport, share, and so on.

Working with both printed and digital versions of documents can be time consuming and difficult. People spend time moving between paper and digital documents as they choose the medium that works best for each part of an activity. For example, writing a proposal might involve brainstorming on paper, typing up a digital draft, printing it to read and annotate on paper, perhaps sharing with a colleague who further manually annotates the paper, and then sending an updated digital version to colleagues for feedback. While writing code, a programmer might refer to hand written notes on a printed copy of a specification document while also viewing digital documents related to the printed copy, for example, source code files and data files. Currently, people move awkwardly between physical and digital documents. There have been no tools to help people work smoothly with both physical and digital documents. There has been no way to easily manage relationships between digital and paper artifacts. It has not been convenient for a person to locate a paper document's digital version, or the reverse. Nor has it been convenient to perform operations on a paper document's digital original or on digital documents that are related to a physical document that a person is currently working with.

SUMMARY

The following summary is included only to introduce some concepts discussed in the Detailed Description below. This summary is not comprehensive and is not intended to delineate the scope of the claimed subject matter, which is set forth by the claims presented at the end.

Various embodiments described below facilitate linking physical documents and related digital documents. Links can link multiple physical documents to multiple digital documents. The physical documents are automatically identified on a digital workspace. The digital workspace has one or more sensors to automatically detect physical documents. A computer is capable of displaying graphics and detecting user interaction with the displayed graphics. The digital workspace displays a graphical user interface (GUI) component having one or more controls generated by the computer, and the GUI component is displayed at a location relative to a physical document on the digital workspace. User interaction with the control is automatically detected and in response either a link between the physical document and one of the digital documents is edited, or a maintained link between the physical document and a digital document is used to perform an operation on the digital document. Alternatively or additionally, digital documents may be implicitly related—and therefore linked—to the physical document.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to bridging the gap between the use of paper documents and digital documents. Discussed first are arrangements and processes for detecting physical or paper documents and providing an interactive graphical environment in conjunction with the physical documents. A model for relating physical and digital documents is discussed next. Details of a user interface for interacting with physical documents and managing links between physical and digital documents are then explained, followed by description of other techniques for facilitating interaction between physical and digital documents in a digital workspace.

Figure 1:
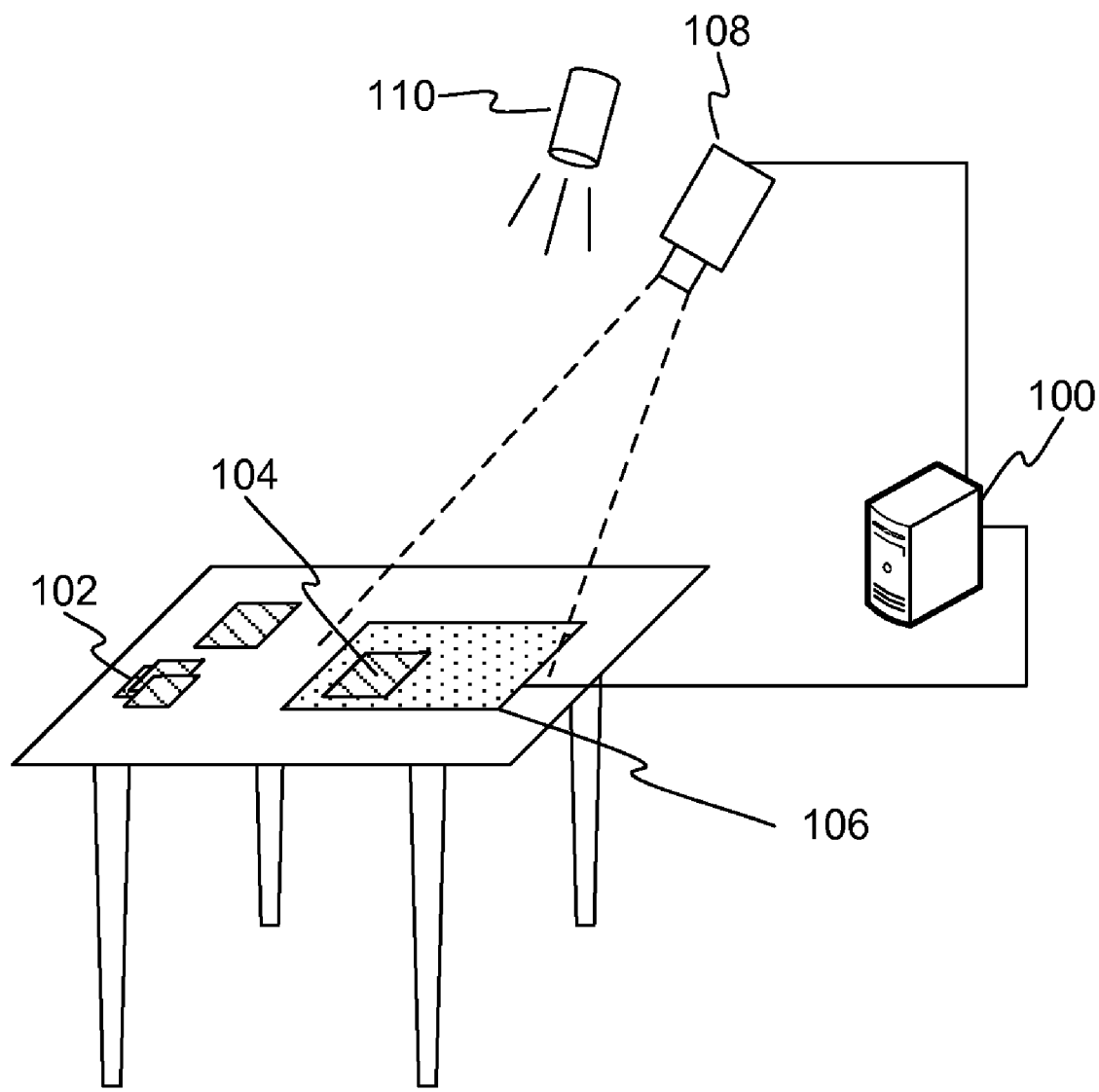
FIG. 1 shows an arrangement for identifying physical documents and displaying a user interface proximate to the physical documents.

FIG. 1 shows an arrangement for identifying physical documents and displaying a user interface proximate to the physical documents. In the example arrangement shown in FIG. 1, a computer 100 stores various digital documents, such as word processing documents, spreadsheets, text documents, images, emails, markup language documents, and the like. Various physical documents 102, 104 are on a table or desk. The physical documents 102, 104 may be paper documents or some other thin material or items on which information is imprinted. A physical document 102, 104 could also be "digital paper" that can change the information shown thereon. The computer 100 is coupled with a display 106, to which the computer 100 can send a display signal for displaying graphics generated by the computer 100. The display 106 may also function as an input surface that can be interacted, for example, with a stylus, a finger, etc. In the example arrangement, a camera 108 captures images of the display 106, any physical documents on the display, and possibly some surrounding area of the table. The camera 108 may be a video camera or a still photography camera that captures images recurringly. The camera 108 is coupled with the computer 100, which receives the images and performs image analysis thereon. In one embodiment image analysis may be improved by including an infrared light 110 that illuminates the work area (display 106 and optionally some of the table).

Other arrangements and devices can be used with techniques described later. For example, rather than using a flat panel display 106, a projector can be used to project graphics onto the table or work space. Physical documents might be sensed using RFID tags or other means. Rather than using the display 106, the camera 108 might be used to detect user input. A special pen/stylus might be used, where a sensor senses location or movement of the pen/stylus or the pen/stylus signals its location or movement. As different means for displaying graphics and detecting physical documents can be used, discussion below will refer to a generic arrangement having a digital work area (workspace, work surface, etc.) on which physical documents may be placed, the physical documents may be detected, and computer-generated graphics may be displayed on and/or around the physical documents.

Figure 2:
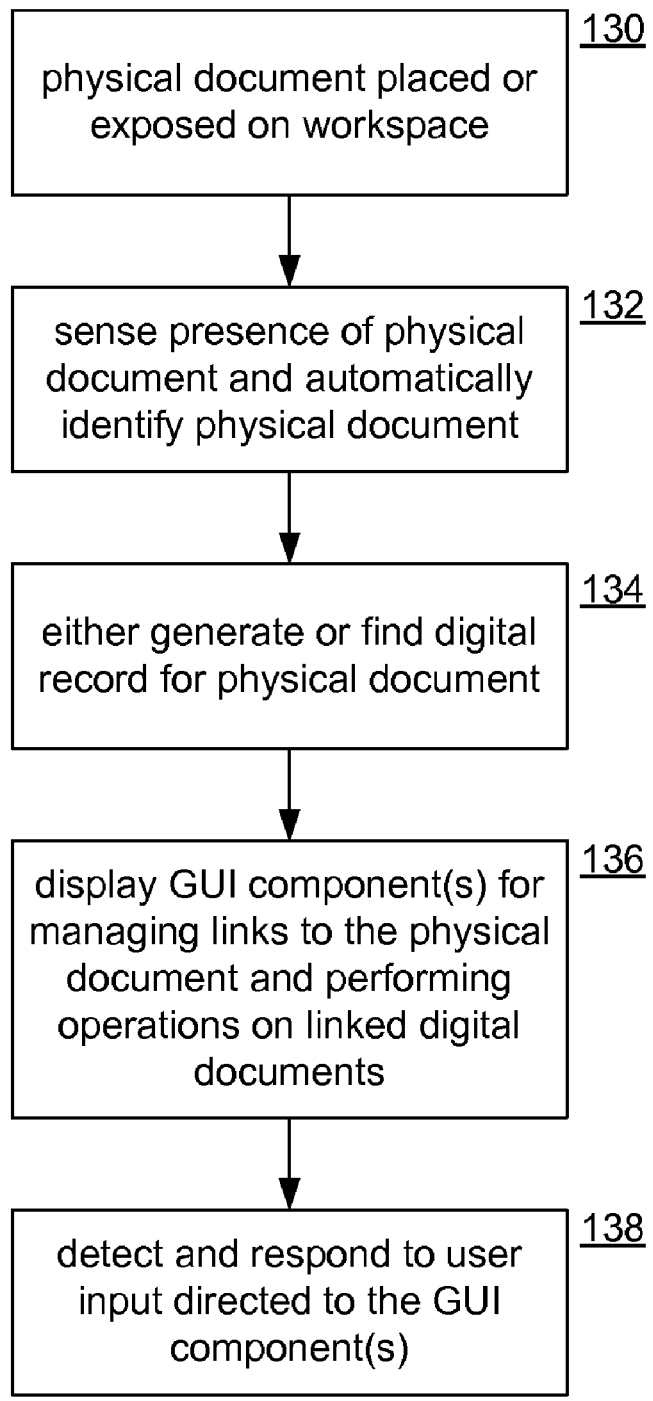
FIG. 2 shows a process performed with the example arrangement shown in FIG. 1.

FIG. 2 shows a process performed with the example arrangement shown in FIG. 1. The steps in FIG. 2, discussed below, may be performed in varying order, and the process, and/or steps thereof, may be frequently repeated to adapt to the changing presence or absence of physical documents on a work area or the display 106.

As the computer 100 processes images captured by the camera 108, physical document 104 is placed or exposed 130 on the workspace or display 106. The computer 100 uses the images to sense 132 the presence of the physical document 104 and automatically identify the physical document 104. Ordinary image processing techniques can be used to sense 132 the presence of the physical document 104 and to identify the physical document 104. The physical document 104 can be identified in a number of ways. A code such as a one or two dimensional bar code printed on the physical document 104 might be extracted and decoded to identify the physical document 104. Text or imagery on the physical document 104 might be analyzed and compared to stored content of many physical documents. Images may be processed to find low-resolution patterns of content on the physical document 104, which may be compared to stored patterns. A profile of characteristics of the physical document 104 (e.g., background color, size, word count, font features, etc.) may serve as a unique identifier for the physical document 104. In another embodiment, user input may be requested to identify the physical document 104, perhaps among multiple candidates. The result of identifying the physical document 104 may be an identifier uniquely identifying the physical document 104 among other physical documents 102.

Once an identifier identifying the physical document has been obtained, the identifier is used to generate or find 134 a record or object for storing information associated with the physical document 104. For example, a table of records or collection of objects, indexed by document identifiers, may store records for the physical documents, and the record pointed to by the physical document 104's identifier may be found 134. If there is no record for the physical document 104's identifier, then a new record may be generated. In one embodiment, the found 134 record for the physical document 104 may store various fields of information about the physical document 104. For example, the record may store a version number, a prior image of the physical document 104, etc. The record may also store a set of digital documents (or indicia thereof) that are linked to or associated with the physical document 104. A linked digital document may also have fields indicating, for example, whether the digital document should be opened or displayed when the physical document 104 is sensed 132, or indicating whether the digital document was manually or implicitly linked to the physical document 104, and so on. The physical document 104's record may also store information about a digital document that is a digital analogue of the physical document 104; a digital document (or version thereof) from which the physical document 104 was printed. The record may also indicate a type or category of the digital document 104, for example, text, image, line drawing, spreadsheet, or others. The record may also store information about which operations can be performed on the physical document 104 and/or the configuration of the user interface that is to be displayed with the physical document 104.

The process of FIG. 2 displays 136 graphical user interface (GUI) component(s) when physical document 104 is sensed 132. The GUI component(s) may have components for managing (e.g., creating, deleting, viewing) links between the physical document 104 and digital documents. The GUI component(s) may include components for performing operations related to the physical document (or its digital analogue), or for performing operations on digital documents linked to the physical document 104, as indicated in the physical document 104's record. GUI aspects will be described in detail later with reference to FIGS. 4 and 6. The display 136 of GUI or user interface component(s) may be based on the location of the physical document 104. For example, a toolbar might be displayed at or near an edge of the physical document 104, the location of the physical document 104 may be tracked, and the toolbar may be moved in correspondence to the tracked movement of the physical document 104.

By various means mentioned above, a user may direct input to the GUI component(s). The process detects and responds 138 to such user input. For example, a user input may indicate actuation of a GUI button for emailing a digital document version of the physical document 104. A variety of user inputs and responses are described further below.

Figure 3:
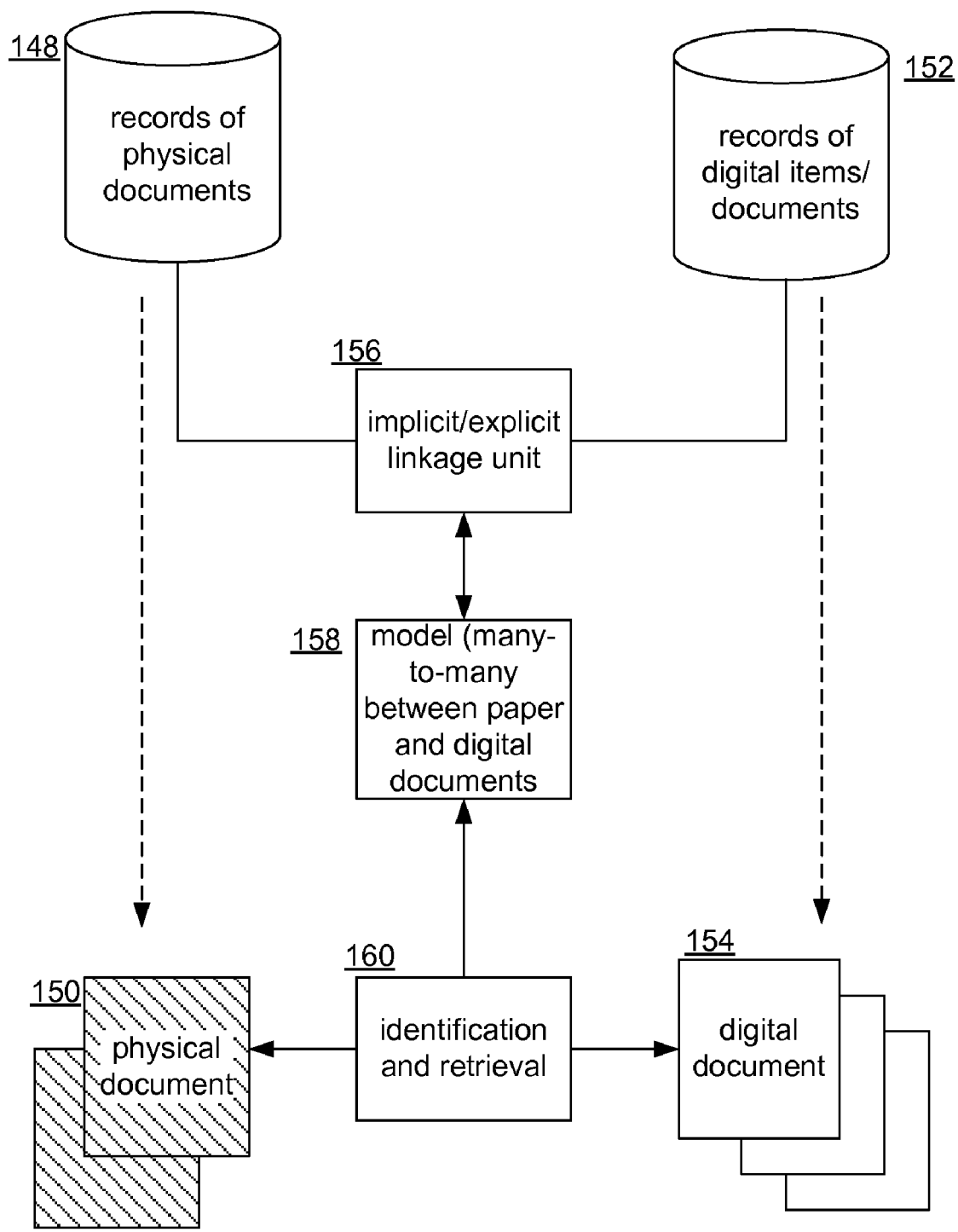
FIG. 3 shows a model for linking physical and digital documents.

FIG. 3 shows a model for linking physical and digital documents. A storage 148 stores objects or records of physical artifacts or paper/physical documents. The records in storage 148 correspond to physical documents 150 that may be placed on a digital workspace (e.g., on display 106). The computer 100 also has a storage 152 storing records of digital documents 154 stored or accessible by the computer 100. The records in storage 152 may store URIs, full-path filenames of files in the computer 100's filesystem, or other information pointing to digital documents 154 (or digital documents themselves). A linkage unit 156 is used to generate links between document records in the storage 152 and records of physical documents in the storage 148. The linkage unit 156 may generate links according to manual user input, or may analyze information about a physical document to identify logically related digital documents. For example, temporal or semantic information about documents may be used to determine which documents may be relevant to a user. Layout information, such as spatial proximity of the digital and or physical documents to each other on the display/surface may be used to identify implicitly related documents. Documents which are used at the same time may also be linked. Links generated by linkage unit 156 are stored in a document model 158. The document model 158 models many-to-many relations between physical documents 150 and the digital documents 154 by storing links between corresponding records in storage 148 and storage 152. An identification and retrieval module 160 receives an image of a physical document 150, identifies the physical document using image analysis, a bar code, optical character recognition, etc., passes an identifier of the physical document 150 to the model 158 which uses the identifier to find and the physical document's record and identifiers of any digital documents 154 that are linked to the physical document 150.

Those skilled in the art of software development will appreciate that the model shown in FIG. 3 is somewhat arbitrary and the functionality of the model can take many forms. For example, the storing and linking of records could be performed with a relational database, the functionality of the linkage unit 156 and the identification and retrieval module 160 could be implemented in one module that interacts with the relational database. Also, the model in FIG. 3 may be arranged to interact with the user interface component(s) displayed with the physical documents. For example, a user may use a GUI component to input information for an explicit link between a physical document and a digital document, and linkage unit 156 may use that input to create and store a corresponding link. The identification and retrieval module 160 may pass retrieved document records to a GUI component which may then display a list of documents that are related to the physical documents or open such documents and display them on the workspace or display 106.

Figure 4:
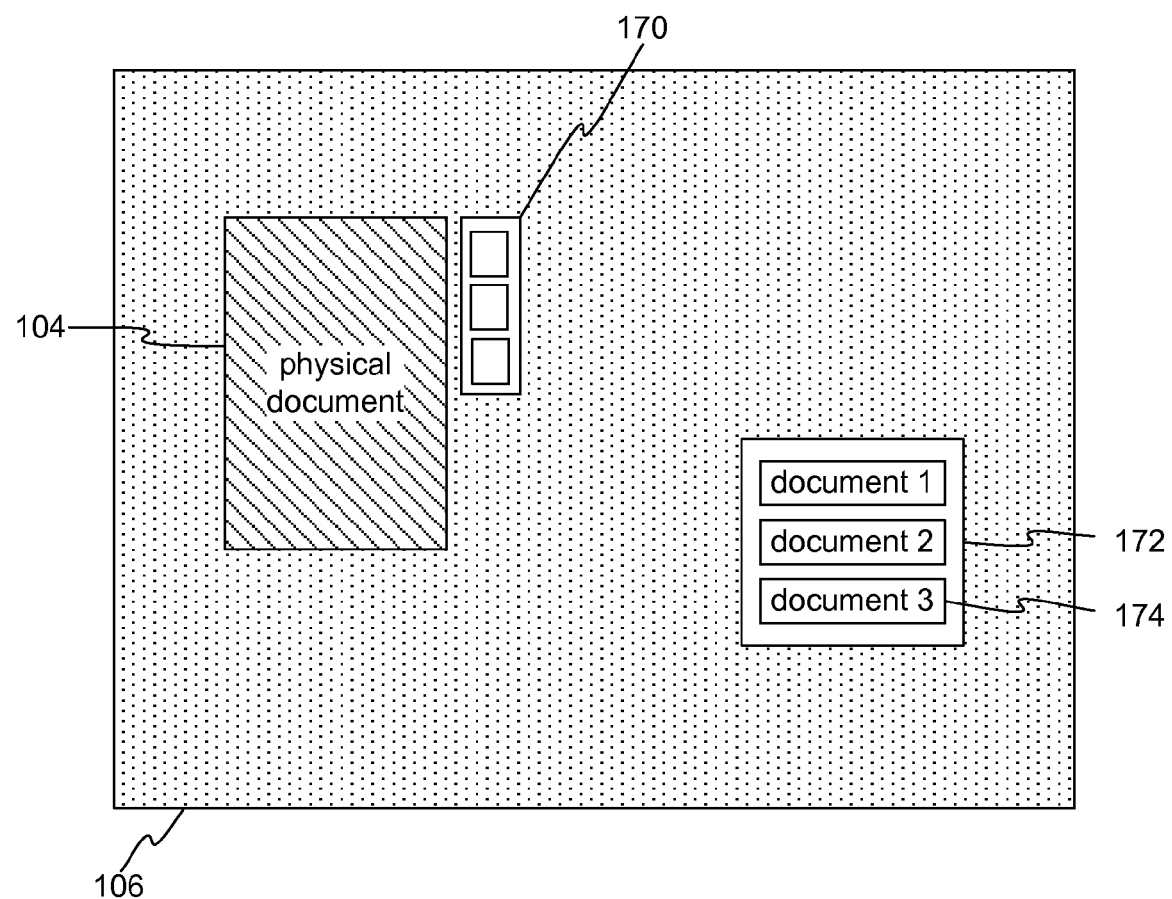
FIG. 4 shows a user interface displayed on display in proximity to a physical document.

FIG. 4 shows a user interface displayed on display 106 in proximity to physical document 104. As discussed above, physical documents on a digital workspace or on a horizontal display such as display 106 may be bridged to the digital realm by providing a user interface with which a user may interact as though interacting with the physical document itself. When the user places the physical document 104 on the display 106, the physical document is detected and identified. If a record exists for the physical document, it is acquired and may be used for the appearance and/or behavior of the user interface. For example, a toolbar 170 may be displayed for performing operations directed to the physical document 104, the operations being performed on the record or representation of the physical document 104 or a digital document analogue of the physical document 104.

If digital documents are linked to the physical document 104 (as might be indicated by links in model 158), then a GUI component 172 (e.g., a dropdown list, a list of hyperlinks, etc.) may be displayed to allow a user to work with the linked digital documents. Alternatively, the GUI component 172 might be displayed in response to activating a control on the toolbar 170. A user interface component or control 174 may be actuated by a user to open corresponding linked documents or to perform other operations on the linked documents. The linked documents may be automatically opened and displayed when the physical document 104 is detected, their display states (e.g., location, minimized/maximized, visible/hidden, etc.) may be captured when the physical document 104 is removed from the physical work space or display 106, and when the physical document 104 is again placed on the work space or display 106, the linked documents may be re-opened and displayed according to their display states captured when the physical document 104 was last placed on the display 106.

In one embodiment, each physical document on the work space has its own user interface component, e.g., a toolbar or menu of commands that tracks the physical document. In another embodiment where a projection-type display is used, the user interface components may be displayed directly on the physical documents. In another embodiment, only one user interface component is used, and it attaches to whichever physical document is determined to be the current focus of the user.

As discussed earlier, links between physical and digital documents may be implicitly or explicitly created. For implicit linking, any number of approaches can be used to automatically link documents that may be related to a physical document. Semantic content of the physical content, context in which the physical document is used (e.g., which documents tend to be open when the physical document is present), the document's type (e.g., text data, audio data, spreadsheet, etc.), or combinations thereof can be used to estimate which digital documents are likely to be related to a physical document. Additionally or alternatively, a user may interact with the user interface to link a physical document to digital items or documents. For example, when the user interface detects the user drawing a line on the workspace from the physical document to a window displaying a digital document (or to an icon or other representation of the digital document), a link between the physical document's record and the digital document may be stored in the document model 158. A displayed digital document could be dragged to the physical document, thereby actuating a link to the physical document. Any variety of known techniques may be used to allow a user to manually indicate that a physical document is linked to a user-specified digital document or item.

Figure 5:
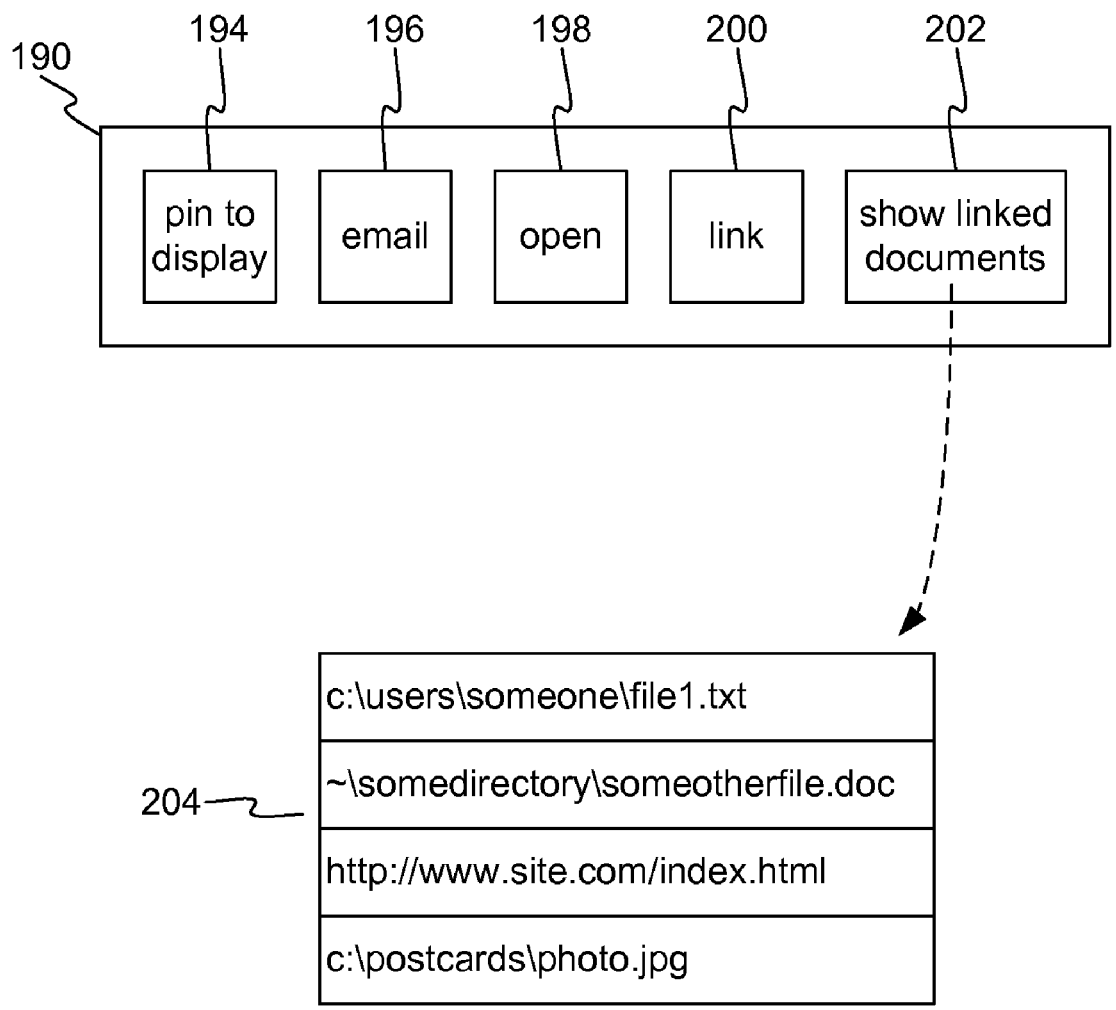
FIG. 5 shows examples of GUI components to be displayed in conjunction with the presence of an associated physical document.

FIG. 5 shows examples of GUI components to be displayed in conjunction with the presence of an associated physical document. A toolbar 190 may be displayed and may be designed to allow operations to be performed on the associated physical document (or, more accurately, on a digital record, object, or the like that represents the physical document). By recognizing a physical document newly placed on the digital work space, identifying a digital document that is the digital equivalent of the physical document, and providing toolbar 190 for performing operations on the physical document's digital equivalent, it becomes possible for a user to conveniently yet coherently work with the physical document and its corresponding digital analogue. The toolbar 190 may be provided with means to actuate a wide range of operations directed to the digital analogue of the physical document. While various example operations are discussed below, many others are possible. For example, a GUI button may be provided to invoke a history operation to display historical information about the document. Historical information might include information about prior digital versions, snapshots of prior physical versions possibly annotated with information about which versions had been printed, or information about which versions had been emailed to/from other people, etc.

A "pin" button 194 may be provided to "pin" to the work space either a camera-captured image of the physical document or a rendered image of the physical document's equivalent digital document. The image may be displayed under the physical document or it may be displayed in the physical document's former location when the physical document is removed from the workspace. An "email" button 196 may be included to enable the physical document's digital analogue to be emailed, for example, by passing the location of the digital document to an email application. An "open" button 198 may be used to actually open or display the analogous digital document.

The toolbar 190 may be provided with a "link" button 200 that can be used to activate a mechanism for creating/editing links between the physical document (i.e., a representation or analogue thereof) and arbitrary digital documents of interest to the user in relation to the physical document. Such a mechanism could be as simple as causing the next "clicked" window to be linked to the physical document, or more complex, for example, displaying a list of candidate digital documents. Candidates might be documents used recently, documents currently open, documents with similar titles or content, documents used in temporal proximity with the physical document or its digital equivalent, and so on. A "show linked documents" button 202 can be activated to display a list 204 of digital documents currently linked to the physical document. The list 204 may be interactive such that user input directed to indicia of a particular digital document (e.g., "c:\users\someone\file1.txt") may display a menu with operations such as "delete link", "open document", etc.

Figure 6:
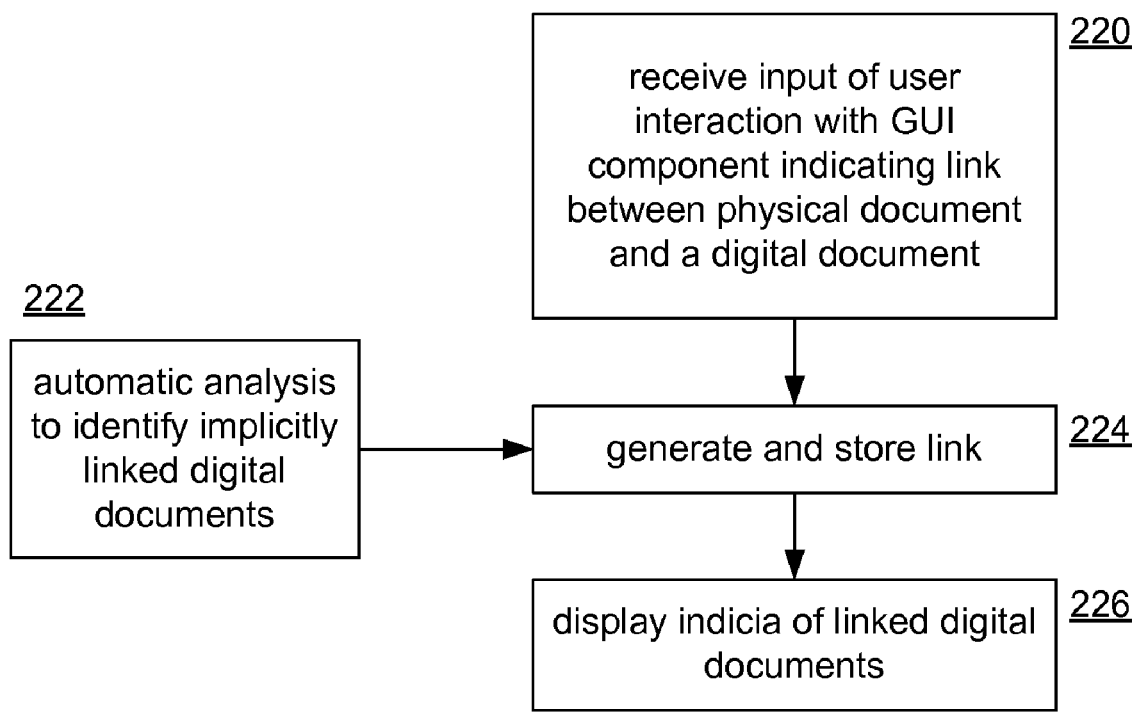
FIG. 6 shows a process for linking digital documents to physical documents.

FIG. 6 shows a process for linking digital documents to physical documents. User input is received 220. As discussed above, the user input may take a number of forms and can be used to determine which digital document is being linked to the physical document (e.g., a file name or an identifier of a graphical object indicated by the user input). The user input is used to generate and store a link, the link indicating which digital document is linked to the physical document. Additionally or alternatively, automatic analysis 222 may be used to identify implicitly related digital documents; documents having some computationally identifiable relation to the physical document. If the physical document is removed from the digital work space, when it is again placed on the digital work space, the stored links can be used to display 226 indicia of which digital documents are linked to the physical document or to display the linked documents themselves. The links for a physical document can be manually edited, deleted, and otherwise managed by the user. Thus, when a physical document is used, its links to digital documents can be managed via the user interface. When the physical document is removed from the digital work space the links are stored. When the physical document is returned to the digital work space, the links can be used again to allow the user to smoothly transition from using the physical document to also using related digital documents in a digital environment.

Figure 7:
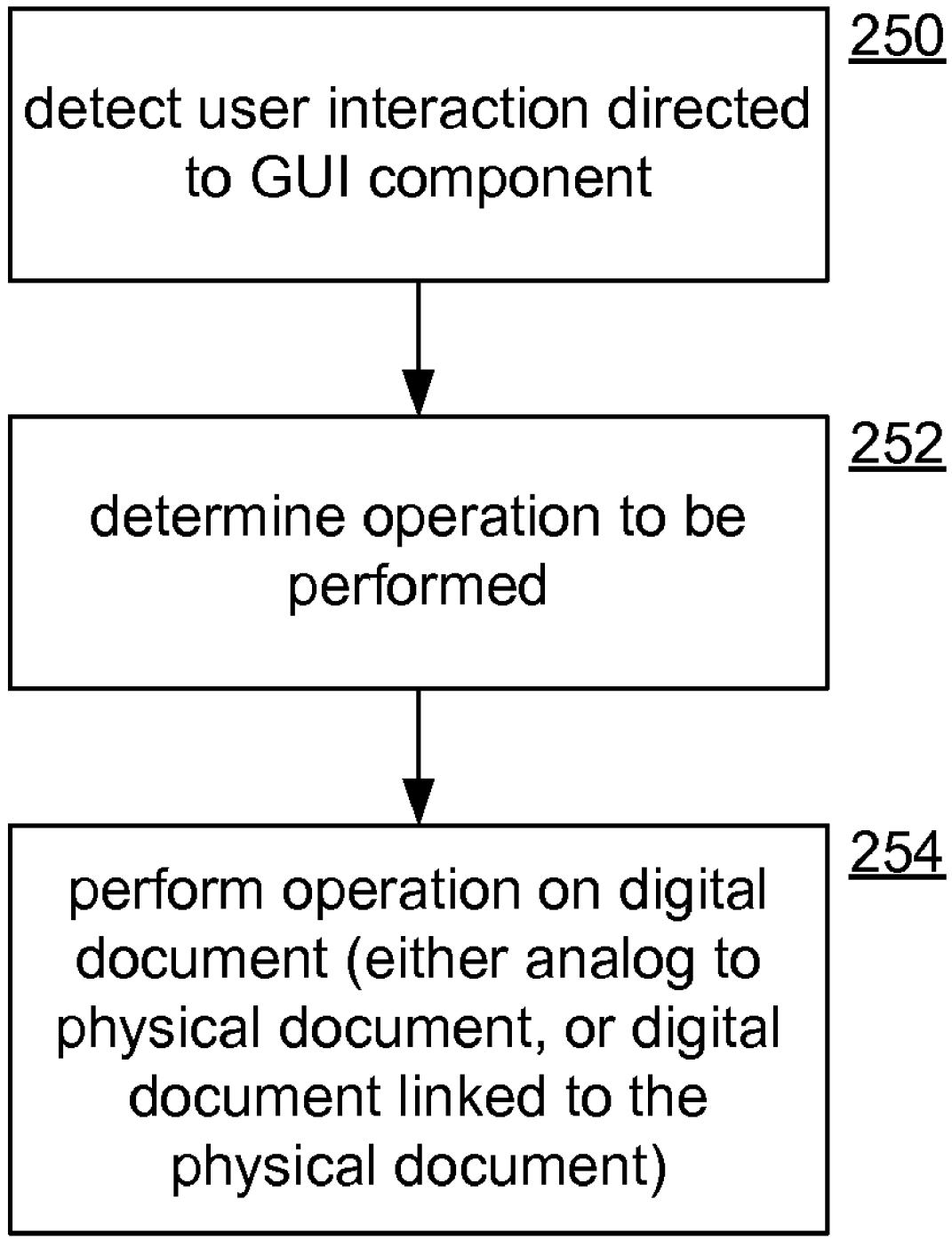
FIG. 7 shows a process for a user to perform operations directed to a physical document on a digital work area.

FIG. 7 shows a process for a user to perform operations directed to a physical document on a digital work area. A user may interact with the user interface of the digital work space to invoke operations on the physical document. Such user interaction could take a variety of forms, for example two-dimensional stroke gestures, context-sensitive pop-up menus, interaction with a toolbar such as toolbar 190, and so on. The user input is detected 250 and used to determine 252 an operation to be performed. The operation might be any of the examples discussed earlier, or others. The operation is then performed 254 on the digital document analogue of the physical document. For example, if the operation is a print operation, the physical document, via its digital version, is printed. If the operation is an email operation, the physical document is in effect emailed by emailing its digital version.

In addition to the techniques discussed above for working with a physical document in a digital context, other techniques can be used to enhance the use of physical documents in a digital workspace. The user interface can provide visual cues when the physical document is out of date, that is, when its digital version has been modified after the physical document was printed. For example, a highlighted note such as "Updated by Pat last Monday" could be displayed. Areas of content that have been changed might also be highlighted. To help a user visualize which documents are linked to which other documents, a window may be displayed in which images of physical documents (extracted from digital images) may be shown and links to digital content may be shown. The digital workspace can also be used to help locate physical documents related to a physical document (consider that a physical document may have a link to another physical document). If many papers are on the workspace, when one physical document is active, some visual indicia may be displayed to indicate where the linked physical documents are. If a projector display is used, such physical documents, even if obscured by other papers, might be pointed to by an arrow, spotlight, etc. In a similar vein, indicia may be displayed to indicate the presence of linked digitally displayed documents that are obscured by paper.

CONCLUSION

The techniques discussed above are useful in the context of a digital workspace where physical documents can be detected, and in proximity to the physical documents, user input can be detected and computer graphics can be displayed. Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable object to be loaded and executed. The embodiments and features can be performed using any type of computing device, for example portable devices, workstations, servers, mobile wireless devices, and so on.

The invention claimed is:

1. A method of linking digital content with paper documents, the method comprising:
   monitoring a digital work area and automatically detecting the presence of a paper document laying directly or indirectly on the digital work area, the digital work area either capable of displaying, or arranged to have displayed thereon, an interactive graphical user interface (GUI) component generated by a computing device;
   in response to automatically detecting the presence of the paper document on the digital work area, automatically displaying the interactive graphical user interface component on the work area, wherein the graphical user interface component is displayed in proximity to the paper document according to a detected location of the paper document;
   generating and storing on the computing device a link that links the paper document to a digital document stored or accessible by the computing device; and
   detecting user interactions directed to the paper document with the graphical user interface component and in response using the stored link to perform operations, which are triggered by the user interactions, on the digital document, the using comprising, when a user interaction is detected, accessing the stored link to identify the digital document that corresponds to the paper document, and performing an operation on the identified digital document.

2. A method according to claim 1, wherein the generating and storing of the link is in response to detecting user interaction with the graphical user interface component, the user interaction identifying the digital document.

3. A method according to claim 1, further comprising: responding to the automatic detection of the presence of the paper document by automatically finding or generating on the computing device a record that corresponds to the paper document, the record identifying a digital document, or version thereof, from which the paper document was printed.

4. A method according to claim 1, further comprising: in response to detecting the paper document, automatically determining that the digital document is implicitly related to the paper document, and in response generating the link to the physical document.

5. A method according to claim 4, further comprising tracking movement of the paper document on the digital work area and moving the displayed graphical user interface according to the movement of the paper document such that the graphical user interface component is displayed to move with the paper document on the digital work area.

6. A method according to claim 1, wherein the GUI component comprises indicia of the digital document, and wherein the user interaction is with or directed to the indicia of the digital document.

7. A method according to claim 1, wherein the graphical user interface comprises a graphic control that a user can interact with to direct an operation to be performed on the digital content.

8. One or more computer readable media storing information for enabling a computer to perform a process, the process comprising:
    maintaining and storing a set of links between physical documents and digital documents, where the links link multiple physical documents to multiple digital documents, and where the links link multiple digital documents to multiple physical documents;
    automatically identifying various physical documents as they are placed or uncovered on a digital workspace, the digital workspace comprising an area: where one or more sensors automatically detect physical documents, where a computing device is capable of displaying graphics generated thereby, and where user interaction with the displayed graphics can be detected;
    displaying with the digital workspace a GUI component comprising one or more user interface controls generated by the computing device, the GUI component being displayed at a location relative to a detected location of one of the physical documents lying on the digital workspace; and
    automatically detecting user interaction with the control of the GUI component and in response directing an operation to the paper document comprising either editing a link between the physical document and one of the digital documents, or using a maintained link between the physical document and a digital document to perform an operation on the digital document.

9. One or more computer readable media according to claim 8, wherein the editing comprises creating a new link between the paper document and one of the digital documents.

10. One or more computer readable media according to claim 8, further comprising determining that a digital document from which a physical document was printed has been revised since the physical document was printed and displaying a graphic on the digital workspace indicating the paper document is out of date.

11. One or more computer readable media according to claim 8, wherein the editing comprises creating a new link between the physical document and one of the digital documents.

12. One or more computer readable media according to claim 8, wherein the GUI component corresponds to a particular physical document and the GUI component comprises a control that when activated by a user displays indicia of digital documents that are linked to the particular physical document.

13. One or more computer readable media according to claim 8, the process further comprising detecting that the user has activated a pin control of the GUI component and in response pinning, on the digital workspace and under the physical document, an image of the physical document to the digital workspace.

14. One or more computer readable media according to claim 8, the process further comprising determining whether a particular physical document has links to any other physical documents on the digital workspace and in response displaying graphics to indicate the presence of such related physical documents.

15. A method of managing relations between paper and digital documents using a digital work area, the digital work area comprising an area where graphics can be displayed in proximity to the paper documents, where images of the work area are captured, and where user input can be detected, the method comprising:
    repeatedly capturing images of the digital work area to detect any paper documents on the digital work area, and from the images detecting when one of the paper documents is on the digital work area;
    using an image containing the paper document to determine a first location comprising a location of the paper document and to identify the paper document and a digital document from which the detected paper document was printed; and
    as the paper document remains on the digital work area after being identified, displaying on the digital work area a user interface with which a user can interact to invoke operations directed to the digital document and the paper document corresponding to the digital document, wherein the user interface is displayed at a second location computed according to the first location such that that the user interface is displayed in physical proximity to the paper document.

16. A method according to claim 15, wherein the operations include managing links between the paper document and one or more digital documents, and the method further comprising generating and storing links between the paper documents and the digital documents, and when the paper document is identified using links between the paper document and one or more of the digital documents to display indicia of the digital documents.

17. A method according to claim 15, wherein the links are generated responsive to user interaction with the user interface, the user interaction indicating a digital document to be linked to the corresponding paper document.

18. A method according to claim 17, wherein a first paper document on the digital work area has a first instance of the user interface and a second paper document on the digital work area has a second instance of the user interface, and the first and second user interfaces are displayed and undisplayed responsive to determining, using the images, the presence or absence of the first and second paper documents on the digital work area.

19. A method according to claim 15, further comprising using the links between the paper document and one or more of the digital documents to allow a user to interact with the digital work area to select one of the one or more digital documents.

20. A method according to claim 15, further comprising automatically determining that a plurality of digital documents are related to the paper document and in response generating and storing links between the paper document and the digital documents.

* * * * *

UNITED STATES PATENT AND TRADEMARK OFFICE
CERTIFICATE OF CORRECTION

| | | |
|---|---|---|
| PATENT NO. | : 8,286,068 B2 | Page 1 of 1 |
| APPLICATION NO. | : 12/109727 | |
| DATED | : October 2, 2012 | |
| INVENTOR(S) | : Brush et al. | |

It is certified that error appears in the above-identified patent and that said Letters Patent is hereby corrected as shown below:

In the Specification

Column 4, line 55, delete "and or" and insert -- and/or --, therefor.

In the Claims

Column 10, lines 34-35, Claim 15, delete "that that" and insert -- that --, therefor.

Signed and Sealed this
Seventeenth Day of February, 2015

Michelle K. Lee
*Deputy Director of the United States Patent and Trademark Office*